US010141546B2

(12) United States Patent
Kim et al.

(10) Patent No.: US 10,141,546 B2
(45) Date of Patent: Nov. 27, 2018

(54) INNER CASE OF BATTERY MODULE ASSEMBLY FOR VEHICLE'S BATTERY PACK

(71) Applicant: LG CHEM, LTD., Seoul (KR)

(72) Inventors: Sung-Jong Kim, Daejeon (KR); Chae-Yang Cho, Daejeon (KR); Soon-Ho Ahn, Daejeon (KR)

(73) Assignee: LG CHEM, LTD., Seoul (KR)

( * ) Notice: Subject to any disclaimer, the term of this patent is extended or adjusted under 35 U.S.C. 154(b) by 202 days.

(21) Appl. No.: 14/581,023

(22) Filed: Dec. 23, 2014

(65) Prior Publication Data

US 2015/0111083 A1  Apr. 23, 2015

Related U.S. Application Data

(63) Continuation of application No. PCT/KR2014/003567, filed on Apr. 23, 2014.

(30) Foreign Application Priority Data

Apr. 29, 2013 (KR) .......................... 10-2013-0047475
May 31, 2013 (KR) .......................... 10-2013-0063091

(51) Int. Cl.
*H01M 2/02* (2006.01)
*H01M 2/10* (2006.01)
(Continued)

(52) U.S. Cl.
CPC .......... *H01M 2/0247* (2013.01); *H01M 2/06* (2013.01); *H01M 2/08* (2013.01); *H01M 2/1077* (2013.01);
(Continued)

(58) Field of Classification Search
CPC .. H01M 2/0247; H01M 2/206; H01M 2/1077; H01M 2/06; H01M 2/08;
(Continued)

(56) References Cited

U.S. PATENT DOCUMENTS 6,174,618 B1  1/2001 Nishiyama et al.
2005/0079408 A1*  4/2005 Hirano ................ B60L 11/1874
429/82

(Continued)

FOREIGN PATENT DOCUMENTS

CN  201708198 U  1/2011
CN  102195023 A  9/2011
(Continued)

OTHER PUBLICATIONS

International Search Report, issued in PCT/KR2014/003567, dated Aug. 28, 2014.

*Primary Examiner* — Stephen J Yanchuk
(74) *Attorney, Agent, or Firm* — Birch, Stewart, Kolasch & Birch, LLP

(57) ABSTRACT

Disclosed is an inner case of a battery module assembly in which four battery modules, each having a plurality of cylindrical secondary battery cells (hereinafter, also referred to as 'cells'), are electrically connected in series. The inner case includes a side frame making contact with two facing sides among sides of the battery module assembly, an upper frame making contact with an upper surface of the battery module assembly, and an electrode post electrically connected to an electrode of the battery module assembly and located at a top of the upper frame. Therefore, it is possible to provide an inner case of a stable and economic battery module including a plurality of secondary battery cells.

8 Claims, 4 Drawing Sheets

(51) Int. Cl.
  *H01M 2/20*   (2006.01)
  *H01M 2/06*   (2006.01)
  *H01M 2/08*   (2006.01)
  *H01M 2/30*   (2006.01)
  *H01M 10/04*  (2006.01)
  *H01M 10/625* (2014.01)
  *H01M 10/65*  (2014.01)

(52) U.S. Cl.
  CPC ........... *H01M 2/206* (2013.01); *H01M 2/305* (2013.01); *H01M 10/0422* (2013.01); *H01M 10/625* (2015.04); *H01M 10/65* (2015.04); *H01M 2220/20* (2013.01)

(58) Field of Classification Search
  CPC ............ H01M 2/305; H01M 10/5034; H01M 10/625; H01M 10/0422; H01M 2220/20
  See application file for complete search history.

(56) References Cited

U.S. PATENT DOCUMENTS

| | | | |
|---|---|---|---|
| 2009/0233163 | A1 | 9/2009 | Fang et al. |
| 2010/0015512 | A1 | 1/2010 | Inoue et al. |
| 2011/0269008 | A1* | 11/2011 | Houchin-Miller ........................... B60L 11/1874 429/120 |
| 2012/0121967 | A1 | 5/2012 | Nakamura et al. |
| 2012/0231309 | A1 | 9/2012 | Itoi et al. |
| 2012/0263983 | A1 | 10/2012 | Yoon et al. |
| 2012/0263995 | A1 | 10/2012 | Naito et al. |
| 2012/0301747 | A1 | 11/2012 | Han et al. |
| 2012/0315532 | A1* | 12/2012 | Andersen ................ H01M 2/20 429/175 |
| 2013/0002016 | A1 | 1/2013 | Furukawa et al. |
| 2013/0011710 | A1 | 1/2013 | Naito et al. |
| 2013/0011719 | A1 | 1/2013 | Yasui et al. |
| 2013/0252075 | A1* | 9/2013 | Shimizu ................ H01M 2/202 429/159 |
| 2014/0227570 | A1* | 8/2014 | Hoshi ................. H01M 2/1077 429/90 |

FOREIGN PATENT DOCUMENTS

| | | |
|---|---|---|
| CN | 102447081 A | 5/2012 |
| CN | 102468457 A | 5/2012 |
| CN | 102549803 A | 7/2012 |
| CN | 102859834 A | 1/2013 |
| CN | 203850370 U | 9/2014 |
| CN | 204011509 U | 12/2014 |
| JP | 2-24959 A | 1/1990 |
| JP | 11-111248 A | 4/1999 |
| JP | 2001-256940 A | 9/2001 |
| JP | 2003-162993 A | 6/2003 |
| JP | 2004-185867 A | 7/2004 |
| JP | 2007-95483 A | 4/2007 |
| JP | 3144501 U | 9/2008 |
| JP | 2008-270460 A | 11/2008 |
| JP | 2009-259752 A | 11/2009 |
| JP | 2011-49014 A | 3/2011 |
| JP | 2011-65908 A | 3/2011 |
| JP | 2011-159597 A | 8/2011 |
| JP | 4990422 B1 | 8/2012 |
| KR | 10-2012-0116184 A | 10/2012 |
| KR | 10-2012-0132338 A | 12/2012 |
| WO | WO 2012/093452 A1 | 7/2012 |
| WO | WO 2012/101981 A1 | 8/2012 |

* cited by examiner

INNER CASE OF BATTERY MODULE ASSEMBLY FOR VEHICLE'S BATTERY PACK

CROSS-REFERENCE TO RELATED APPLICATION

The present application is a continuation of International Application No. PCT/KR2014/003567 filed on Apr. 23, 2014, which claims priority to Korean Patent Application No. 10-2013-0047475 filed on Apr. 29, 2013 and Korean Patent Application No. 10-2013-0063091 filed on May 31, 2013 in the Republic of Korea, the disclosures of which are incorporated herein by reference.

BACKGROUND OF THE DISCLOSURE

Field of the Disclosure

The present disclosure relates to a battery module, and more particularly, to an inner case of a battery module assembly for a vehicle's battery pack.

Description of the Related Art

A secondary battery having good application to various product groups and good electric characteristics such as high energy density is widely applied to not only portable devices but also an electric vehicle (EV) or a hybrid electric vehicle (HEV) driven by an electric driving source. The secondary battery has a primary advantage of greatly reducing the use of fossil fuels and a secondary advantage of generating no byproduct in use of energy, and thus attracts attention as a new energy source for enhancing environment-friendly and energy-efficient properties.

Lithium ion batteries, lithium polymer batteries, nickel cadmium batteries, nickel hydrogen batteries, nickel zinc batteries or the like are widely used as secondary batteries at the present. Such a unit secondary battery cell has an operating voltage of about 2.5V to 4.2V. Therefore, if a higher output voltage is demanded, a plurality of secondary battery cells may be connected in series to configure a battery pack. In addition, according to a charge/discharge capacity demanded to the battery pack, a plurality of secondary battery cells may also be connected in parallel to configure a battery pack. Therefore, the number of secondary battery cells included in the battery pack may be various set depending on a demanded output voltage or charge/discharge capacity.

Meanwhile, if a plurality of secondary battery cells is connected in series or in parallel to configure a battery pack, the secondary battery cells included in the battery pack should be firmly connected electrically and mechanically. Therefore, a stable and economic design is required for an inner case of a battery module assembly and a battery pack in order to ensure firm connection of secondary battery cells.

SUMMARY OF THE DISCLOSURE

The present disclosure is designed to solve the problems of the related art, and therefore the present disclosure is directed to providing an inner case of a battery module assembly for a vehicle's battery pack.

In one aspect of the present disclosure, there is provided an inner case of a battery module assembly in which four battery modules, each having a plurality of cylindrical secondary battery cells (hereinafter, also referred to as 'cells'), are electrically connected in series, the inner case including: a side frame making contact with two facing sides among sides of the battery module assembly; an upper frame making contact with an upper surface of the battery module assembly; and an electrode post electrically connected to an electrode of the battery module assembly and located at a top of the upper frame.

According to an embodiment of the present disclosure, the inner case may be coupled to a thread formed at a battery module included in the battery module assembly by means of a hole and screw formed at the side frame.

According to an embodiment of the present disclosure, the side frame may have a hole for dissipating heat of the cells.

According to an embodiment of the present disclosure, the electrode post may be electrically connected by means of a bus bar connected to a top of the battery module assembly.

According to an embodiment of the present disclosure, the upper frame may have a handle.

According to an embodiment of the present disclosure, the upper frame has a space in which a battery management unit is to be mounted.

According to an embodiment of the present disclosure, the upper frame and the side frame may be made of polymer material. At this time, the polymer material may be polycarbonate, an acrylonitrile-butadiene-styrene resin, or a mixture of polycarbonate (PC) and acrylonitrile-butadiene-styrene resin (ABS), which does not contain a halogen element.

In an aspect of the present disclosure, it is possible to provide an inner case of a stable and economic battery module assembly including a plurality of secondary battery cells.

In another aspect of the present disclosure, the inner case prevents lateral and longitudinal vibration of the battery module assembly.

In another aspect of the present disclosure, it is possible to prevent the heat generated by the battery module assembly from being transferred to a battery management unit mounted on the upper frame of the inner case.

BRIEF DESCRIPTION OF THE DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings. In the drawings.

DESCRIPTION OF THE PREFERRED EMBODIMENT

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
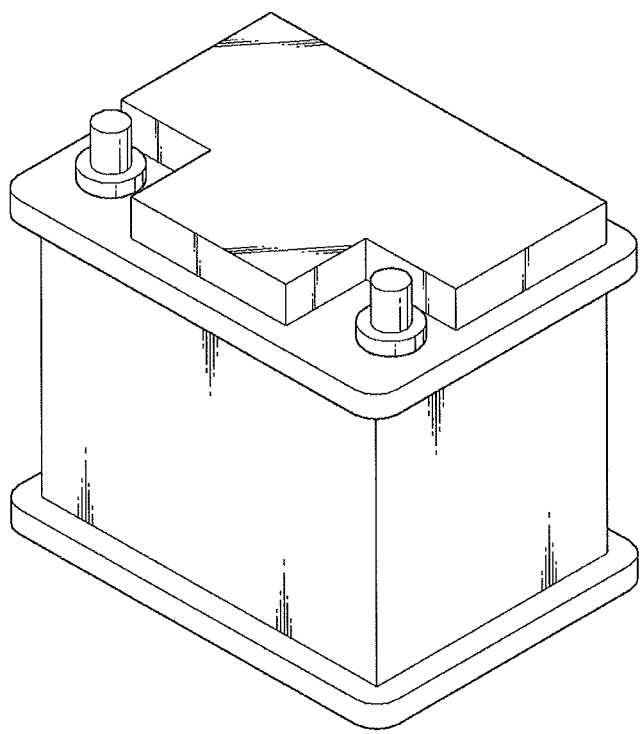
FIG. 1 is a perspective view showing an inner case of a battery pack assembly including battery modules according to an embodiment of the present disclosure.

FIG. 1 is a perspective view showing a battery pack 1 including an inner case 30 of a battery module assembly (hereinafter, referred to as an "inner case") according to an embodiment of the present disclosure.

The battery pack 1 depicted in FIG. 1 is a vehicle's battery pack 1 which may be mounted to a vehicle, a hybrid electric vehicle (HEV), an electric vehicle (EV) or the like.

Preferably, the battery pack 1 may have a size according to the standards for vehicle's batteries. Therefore, the battery pack 1 may have a hexagonal shape as a whole.

Also preferably, the inner case 30 may also have a size according to the standards for vehicle's batteries. However, the battery pack 1 and the inner case 30 are not limited to the above sizes, and their lengths, widths and heights may be set in various ways.

Figure 2:
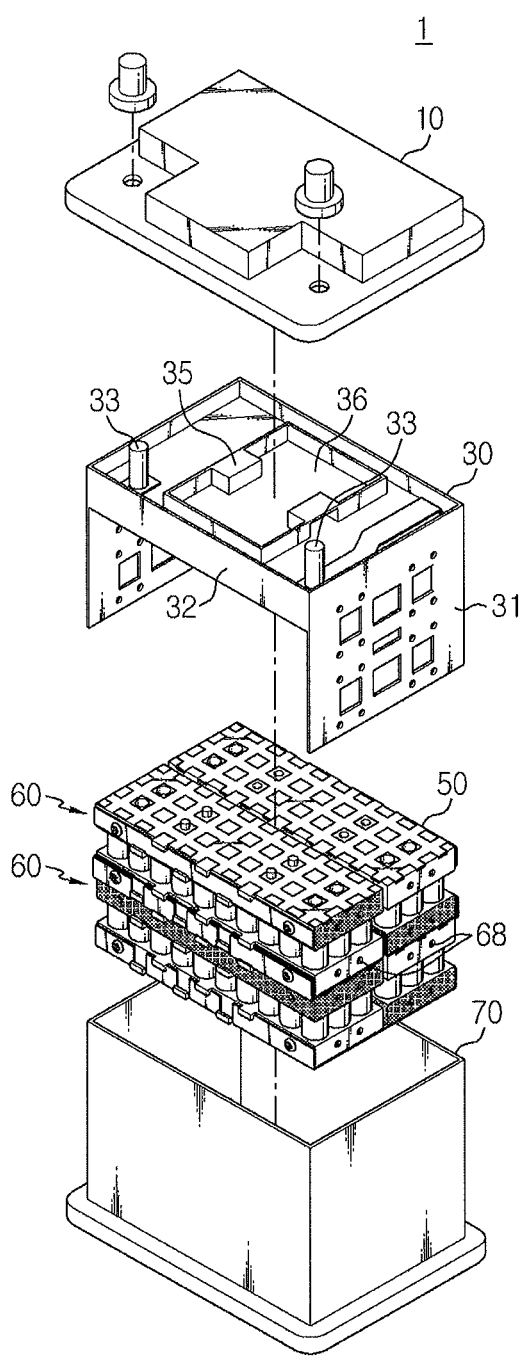
FIG. 2 is an exploded perspective view showing a battery pack including an inner case according to an embodiment of the present disclosure.

FIG. 2 is an exploded perspective view showing a battery pack 1 including an inner case 30 according to an embodiment of the present disclosure.

The battery pack 1 according to an embodiment of the present disclosure may have an operating voltage of 12V when being used for a vehicle. In addition, a secondary battery cell 62 according to an embodiment of the present disclosure may have an operating voltage of 3V. Therefore, four battery modules 60 may be connected in series to configure a battery module assembly 50.

In addition, the battery module assembly 50 and an inner case 30 are included between an upper pack case 10 and a lower pack case 70 to configure the battery pack 1.

Hereinafter, the inner case 30 configured to surround the battery module assembly 50 and included in the battery pack 1 will be described.

Referring to FIG. 2, the inner case 30 according to the present disclosure includes a side frame 31, an upper frame 32 and an electrode post 33.

The side frame 31 makes contact with two facing sides among sides of the battery module assembly 50. In addition, the upper frame 32 makes contact with an upper surface of the battery module assembly 50. Therefore, the inner case 30 is configured to surround the battery module assembly 50.

Figure 3:
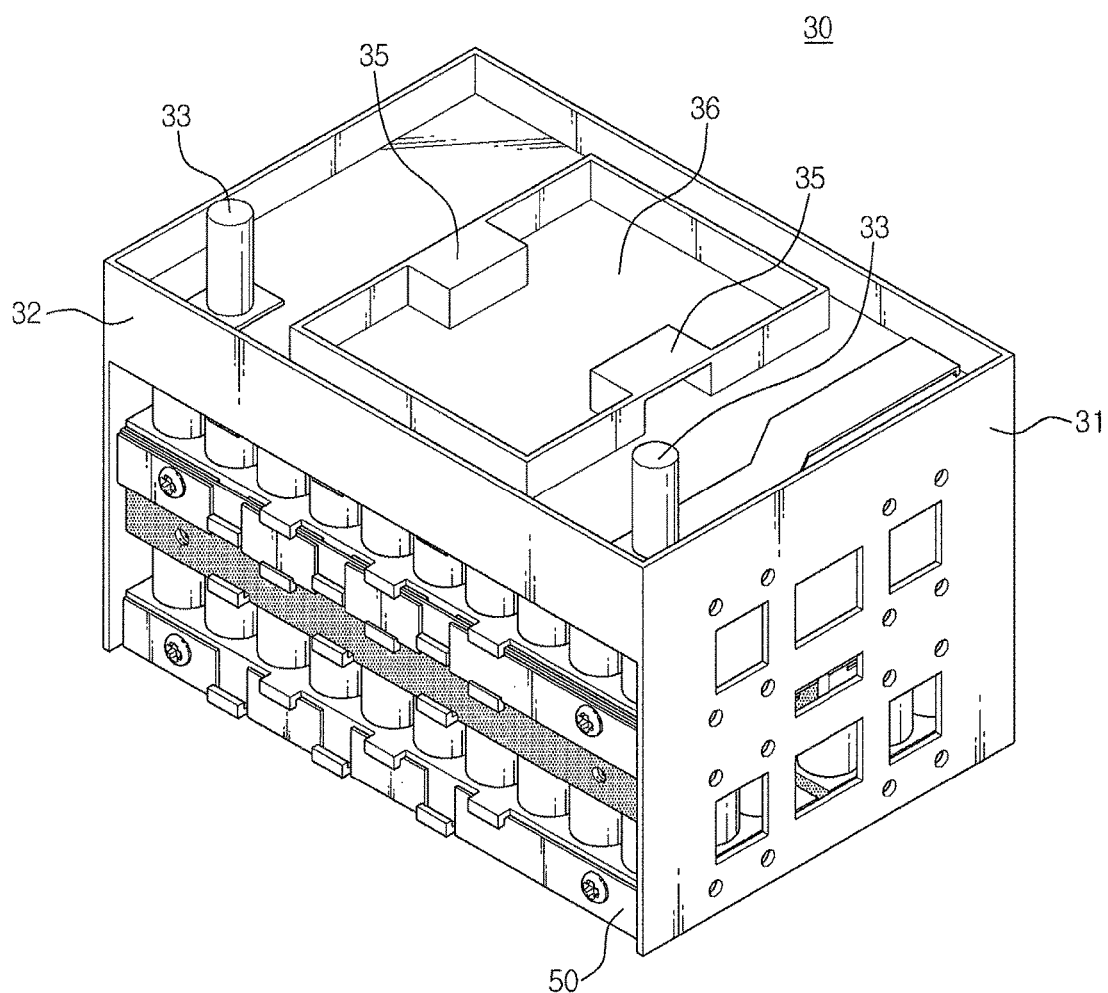
FIG. 3 is a perspective view showing that the inner case according to an embodiment of the present disclosure is coupled to a battery module assembly.

FIG. 3 is a perspective view showing that the inner case 30 according to an embodiment of the present disclosure is coupled to the battery module assembly 50.

Referring to FIG. 3, it may be found that the inner case 30 and the battery module assembly 50 are coupled.

According to an embodiment of the present disclosure, the inner case 30 and the battery module assembly 50 are coupled by means of a screw. The battery module 60 included in the battery module assembly 50 has a thread 68. In addition, a hole is formed in the side frame 31 so that the screw may pass. Therefore, the inner case 30 and the battery module assembly 50 may be coupled by means of the thread 68 as well as the hole and screw.

According to an embodiment of the present disclosure, the side frame 31 has a hole for dissipating heat of the secondary battery cells included in the battery module 60.

The inner case 30 according to an embodiment of the present disclosure may be electrically connected to an electrode of the battery module assembly 50. In addition, the inner case 30 has an electrode post 33, and the electrode post 33 is located at the top of the upper frame 32.

The electrode post 33 is respectively connected to the high potential terminal and the low potential terminal of the battery module assembly 50 and serves as a terminal for electrically connecting the battery module assembly 50 to the outside.

Figure 4:
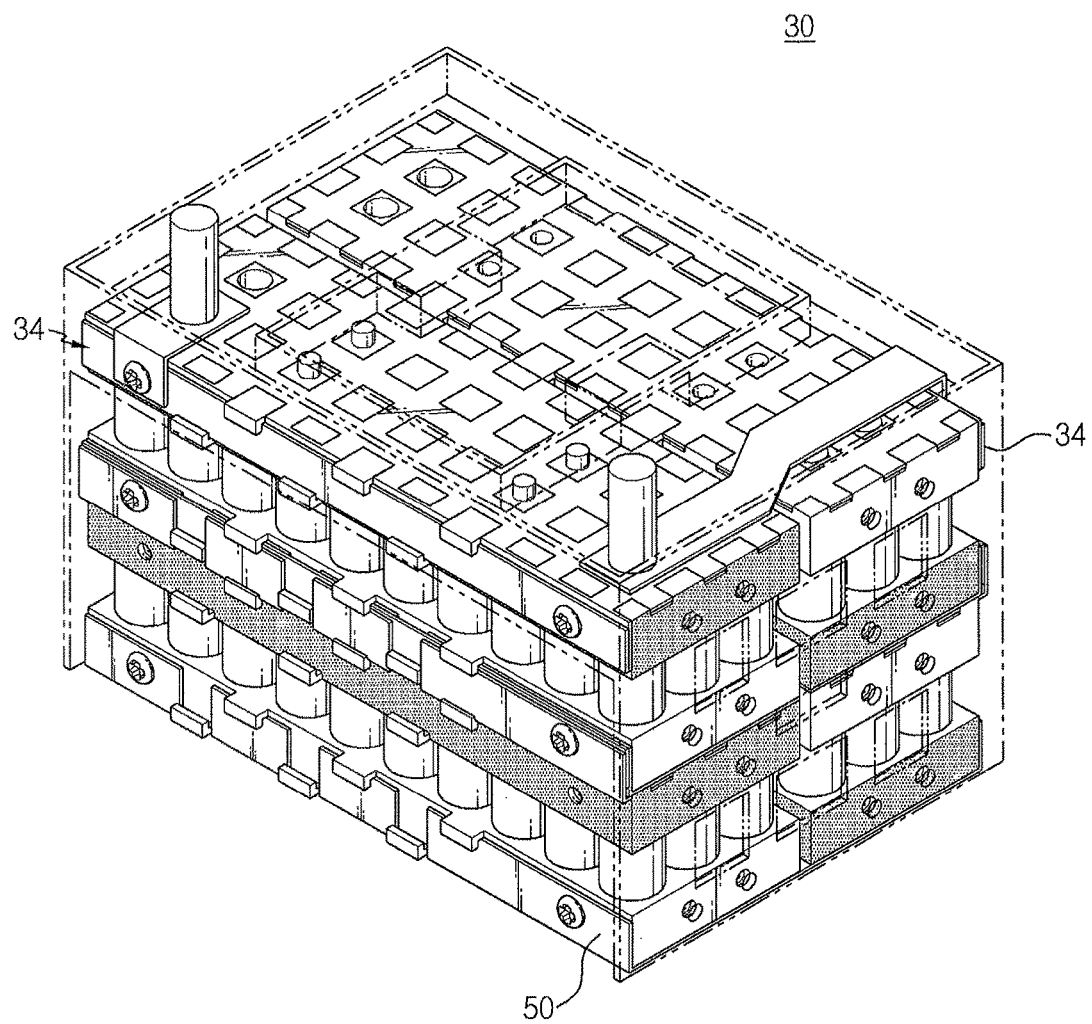
FIG. 4 is a projective view showing that the inner case according to an embodiment of the present disclosure is coupled to a battery module assembly.

FIG. 4 is a projective view showing that the inner case 30 according to an embodiment of the present disclosure is coupled to the battery module assembly 50.

Referring to FIG. 4, it may be found that a bus bar 34 is connected to the top of the battery module assembly 50. The bus bar 34 may be electrically connected to the electrode post 33.

In addition, the electrode post 33 may further include a metal plate preset for the connection to the bus bar 34. The metal plate and the bus bar 34 may be coupled using a screw.

Referring to FIG. 3 again, according to an embodiment of the present disclosure, a handle 35 is formed at the upper frame 32.

The handle 35 allows the battery module assembly 50 to be more easily mounted into the lower pack case 70 depicted in FIG. 2 or separated therefrom.

According to an embodiment of the present disclosure, a space 36 is formed in the upper frame 32 so that a battery management unit (hereinafter, referred to as a 'BMU') may be mounted therein. The BMU may perform various control functions, which are applicable in the level of those having ordinary skill in the art, for example measurement of electric characteristic values such as charge/discharge current and voltage or current of each secondary battery cell 102, control of charging/discharging, control of voltage equalization, estimation of SOC (State Of Charge) or the like.

The upper frame 32 and the side frame 31 may be made of polymer material.

According to an embodiment of the present disclosure, the polymer material is polycarbonate, an acrylonitrile-butadiene-styrene resin, or a mixture of polycarbonate (PC) and acrylonitrile-butadiene-styrene resin (ABS), which does not contain a halogen element.

According to the present disclosure, it is possible to provide an inner case of a stable and economic battery module including a plurality of secondary battery cells. In addition, the inner case may prevent lateral or longitudinal vibration of the battery module assembly, and also prevent the heat generated by the battery module assembly from being transferred to a battery management unit mounted on the upper frame of the inner case.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A battery pack comprising:
  a battery module assembly comprising four battery modules, each module having a plurality of cylindrical secondary battery cells (hereinafter, also referred to as 'cells'), are electrically connected in series, and a bus bar directly connected to a first side surface of the battery module assembly; and
  an inner case, comprising:

a side frame directly contacting two facing sides, other than said first side surface, among sides of the battery module assembly and comprising side frame apertures;

an upper frame comprising a bottom surface configured to directly contact and completely encompass an upper surface of the battery module assembly and the upper frame is directly connected to the side frame, wherein the side frame extends downward from the upper frame; and an electrode post assembly that comprises two electrode posts, each electrode post having a metal plate, wherein each metal plate is electrically connected to and directly contacts the bus bar at the first side surface and the metal plate directly contacts a top surface of the upper frame, wherein the top surface of the upper frame is opposite to the bottom surface of the upper frame, wherein the side frame extends from the upper frame to a bottom surface of the battery module assembly, wherein the side frame is fixedly connected to threaded holes formed at said two facing sides the battery module assembly via screws extending through each of said side frame apertures, wherein the electrode post assembly is electrically connected to an electrode of the battery module assembly via said bus bar, wherein the upper frame and the side frame are comprised of a polymer material, wherein the inner case is configured to be disposed within a lower case and an upper case, wherein the top surface of the upper frame includes at least one enclosed handle and a space configured to mount a battery management unit thereon, and wherein the inner case forms a u-shape and is open at an end opposite to the upper frame.

2. The inner case of a battery module assembly according to claim 1, wherein the side frame has at least one hole, other than the side frame apertures, for dissipating heat of the cells.

3. The inner case of a battery module assembly according to claim 1, wherein the polymer material is polycarbonate.

4. The inner case of a battery module assembly according to claim 1, wherein the polymer material is an acrylonitrile-butadiene-styrene resin.

5. The inner case of a battery module assembly according to claim 1, wherein the polymer material is a mixture of polycarbonate (PC) and acrylonitrile-butadiene-styrene resin (ABS), which does not contain a halogen element.

6. The battery pack of claim 1, wherein the inner case is attached to the battery modules.

7. The battery pack of claim 1, further comprising:

an upper pack case disposed over the inner case; and a lower pack case, wherein the inner case and the battery module assembly are mounted in the lower pack case, and wherein the entirety of the inner case and the battery module assembly are encompassed by the upper pack case and the lower pack case.

8. The battery module assembly according to claim 7, further comprising a battery management module positioned on the space of the upper frame of the inner case.

* * * * *